(12) United States Patent
Le et al.

(10) Patent No.: US 8,798,384 B2
(45) Date of Patent: Aug. 5, 2014

(54) DYNAMIC IMAGE COMPRESSION FOR IMAGING WHILE DRILLING APPLICATIONS

(75) Inventors: Trung Hai Le, Celle (DE); Andreas Hartmann, Celle (DE)

(73) Assignee: Baker Hughes Incorporated, Houston, TX (US)

( * ) Notice: Subject to any disclaimer, the term of this patent is extended or adjusted under 35 U.S.C. 154(b) by 224 days.

(21) Appl. No.: 13/524,671

(22) Filed: Jun. 15, 2012

(65) Prior Publication Data

US 2012/0321209 A1 Dec. 20, 2012

Related U.S. Application Data

(60) Provisional application No. 61/497,683, filed on Jun. 16, 2011.

(51) Int. Cl.
*G06K 9/46* (2006.01)

(52) U.S. Cl.
USPC ............. 382/250; 382/235; 382/243; 175/26; 702/2

(58) Field of Classification Search
USPC .................. 382/235, 243, 250; 175/26; 702/2
See application file for complete search history.

(56) References Cited

U.S. PATENT DOCUMENTS

| | | | |
|---|---|---|---|
| 6,061,299 A | 5/2000 | Grouffal et al. | |
| 6,154,493 A | 11/2000 | Acharya et al. | |
| 7,042,367 B2 | 5/2006 | Gardner et al. | |
| 7,167,101 B2 | 1/2007 | Golla et al. | |
| 7,200,492 B2 * | 4/2007 | Hassan et al. | 702/6 |
| 7,272,504 B2 | 9/2007 | Akimov et al. | |
| 7,345,594 B2 * | 3/2008 | Huang et al. | 340/854.3 |
| 7,554,329 B2 | 6/2009 | Gorek et al. | |
| 8,362,915 B2 * | 1/2013 | Mehta et al. | 340/854.1 |
| 8,485,277 B2 * | 7/2013 | Hulden et al. | 175/26 |
| 8,494,827 B2 * | 7/2013 | Mutlu et al. | 703/10 |

OTHER PUBLICATIONS

U.S. Appl. No. 61/437,301, filed Jan. 28, 2011.
Li, Jiang, et al.; "Efficient Compression of Borehole Resistivity and Acoustic Imaging Data Using Wavelets"; Geophysics; vol. 70, No. 6; p. F53-F60; Nov.-Dec. 2005.
Notification of Transmittal of the International Search Report and the Written Opinion of the International Searching Authority, or the Declaration; PCT/US2012/042235; Feb. 19, 2013.

* cited by examiner

*Primary Examiner* — Yosef Kassa
(74) *Attorney, Agent, or Firm* — Cantor Colburn LLP

(57) ABSTRACT

A dynamic data compression system for forming and transmitting data from a downhole location within a borehole penetrating the earth to a surface location includes a data source that forms raw data sets of a formation contacting the borehole, the raw data sets being formed at a fixed rate and a data rate sampler that determines a transmission rate of a transmission channel. The system also includes a compression engine configured to compress the raw data sets according to compression parameters to form compressed data sets. The compression parameters are dynamically changed based on the transmission rate.

20 Claims, 5 Drawing Sheets

DYNAMIC IMAGE COMPRESSION FOR IMAGING WHILE DRILLING APPLICATIONS

PRIORITY CLAIM

This application claims priority under 35 U.S.C. §119(e) to U.S. Provisional Patent Application Ser. No. 61/497,683, filed Jun. 16, 2011, entitled DYNAMIC IMAGE COMPRESSION FOR IMAGING WHILE DRILLING APPLICATIONS, and which is hereby incorporated by reference in its entirety.

BACKGROUND

1. Field of the Invention

The present invention relates to systems and methods for dynamically compressing images to be transmitted in drilling situations.

2. Description of the Related Art

Boreholes are drilled deep into the earth for many applications such as hydrocarbon production, geothermal production, and carbon dioxide sequestration. As the borehole is drilled, images of the formation surrounding the borehole can be formed. These images are often referred to as "resistivity images."

Resistivity images can be formed by utilizing transmitter/electrode sensor configuration that measures formation resistivity near the borehole. The resistivity images can be used to identify, for example, faults and formation bed boundaries and may be formed with either a wireline tool (wireline measurement) or while drilling (measuring while drilling; MWD). In the case of wireline measurement, the image can be transferred at or near full resolution in real-time due to the large bandwidth of the wireline. In MWD situations, the communication bandwidth may be limited by the communication transmission channel. For example, in transmission channels with low bandwidth, such as the mud utilized in mud pulse telemetry, in order to transmit the data in a timely manner, the raw images formed by an MWD tool need to be compressed before being transmitted to the surface. The received, compressed images can then be decompressed at the surface to "recreate" the raw images.

There are a number of compression methods, all with their advantages and disadvantages. The joint photographic experts group (JPEG) method is one method to compress an image. The JPEG method is a lossy compression method that loses some of the data related to the image during the compression. In very low bandwidth telemetry systems, the JPEG method has proven to provide the images in real-time with acceptable quality. However, some problems can occur. For example, and as explained more fully below, the nature of the JPEG methods causes more detailed (less homogenous) images to degrade more than less detailed images.

According to the JPEG method, the transmission of an image includes transmitting a header that identifies the image that is to follow. For instance, in some cases, the header can include a time stamp or other identifying indication. The compressed image data follows the header. One property of the JPEG method is that the main features of an image are always transmitted first and the "details" are sent later in a bit-by-bit manner. The more data that is received, the more detail the decompressed image has. In operation, a MWD tool acquires an image, compresses the image and then transmits the information. In many applications, a certain time slot or percentage of the bandwidth of the transmission channel is assigned to transmitting the images. Thus, the transmission rate of the transmission channel limits the amount of detail that can be transmitted per image. That is, in MWD applications where the transmission rate is substantially constant, every compressed image will be transmitted with approximately the same number of data words regardless of the amount of detail. As a consequence, images with a lot of details can experience greater compression losses than more homogeneous ones.

BRIEF SUMMARY

According to one embodiment, a dynamic data compression system for forming and transmitting data from a downhole location within a borehole penetrating the earth to a surface location includes a data source that forms raw data sets of a formation contacting the borehole at a fixed rate and a data rate sampler that determines a transmission rate of a transmission channel. The system also includes a compression engine configured to compress the raw data sets according to compression parameters to form compressed data sets, wherein the compression parameters are dynamically changed based on the transmission rate.

According to another embodiment, a method of dynamically compressing resistivity images formed by an imager of a formation contacting a borehole penetrating the earth includes compressing a raw image received from the imager to form an intermediate image, the intermediate image having a compression factor and being compressed according to compression parameters; determining a transmission rate of a transmission channel communicatively coupling the imager to a surface location; determining with an image compression engine located in the borehole that a needed compression ratio that is based on the transmission rate is greater than one; dynamically adjusting the compression parameters to form adjusted compression parameters such that the compression ratio is less than one; and compressing the raw image according the adjusted compression parameters.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method presented herein by way of exemplification and not limitation with reference to the Figures.

Embodiments of the present invention are directed to the dynamic adjustment of the compression parameters based on a transmission rate of transmission channel and the complexity of an image to be transmitted. In other embodiments, a particular image can be divided into smaller images and then compressed. In such an embodiment, variations of the transmission window for the smaller images can be taken into account to keep transmission time-delay below a certain level. While the term "image" is used below, one of ordinary skill will realize that the teachings herein can be applied to any type of data, not just data that represents images.

Figure 1:
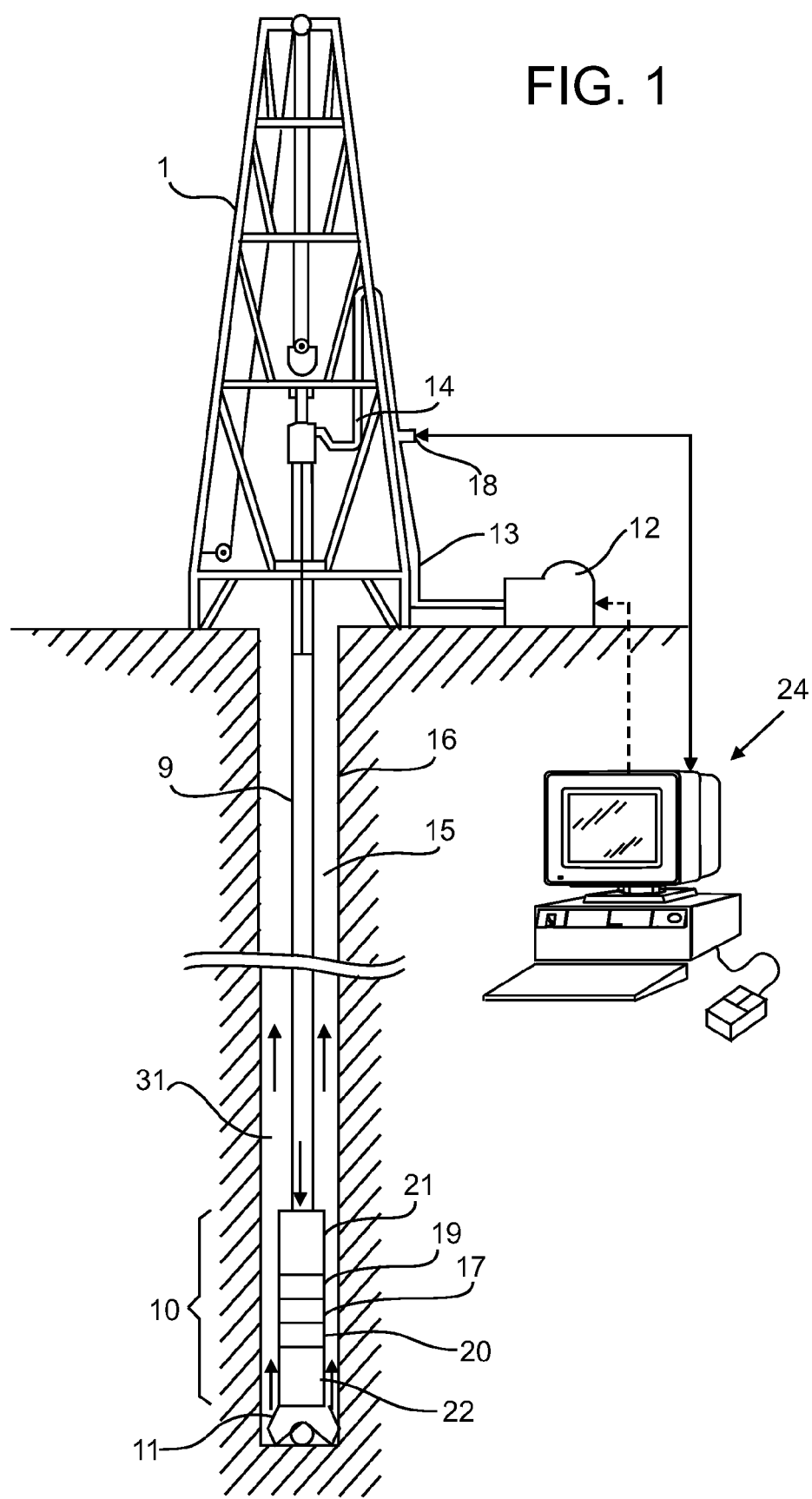
FIG. 1 illustrates a drilling system in which embodiments of the present invention can be implemented.

FIG. 1 is a schematic diagram showing a drilling rig 1 engaged in drilling operations. Drilling fluid 31, also called drilling mud, is circulated by pump 12 through the drill string 9 down through the bottom hole assembly (BHA) 10, through the drill bit 11 and back to the surface through the annulus 15 between the drill string 9 and the borehole wall 16. The BHA 10 may comprise any of a number of sensor modules 17, 20, 22 which may include formation evaluation sensors and directional sensors. The sensor modules 17, 20, 22 can measure information about any of, for example, the tension or stain experienced by the drill string, temperature, pressure, and the like. In one embodiment, one of the sensor modules 17, 20, 22 is a formation resistivity imager. In another embodiment, one of the sensor modules 17, 20, 22 could be another type of imager such as, for example, an acoustic or density imager. Further, one of the sensor modules 17, 20, 22 could be a high data volume non-imaging sensors, such as a seismic while drilling sensor, where compressed data is transmitted to surface in real-time. In general, a resistivity imager causes a current to be induced in a formation and, based on measured current received back from the formation, produces an image. The image is then compressed via a lossy compression scheme (e.g., JPEG) and transmitted to the surface as is more particularly explained below.

While not illustrated, it shall be understood that the drilling rig 1 can include a drill string motivator coupled to the drill string 9 that causes the drill string 9 to bore in into the earth. The term "drill string motivator" relates to an apparatus or system that is used to operate the drill string 9. Non-limiting examples of a drill string motivator include a "lift system" for supporting the drill string 9, a "rotary device" for rotating the drill string 9, a "mud pump" for pumping drilling mud through the drill string 9, an "active vibration control device" for limiting vibration of the drill string 9, and a "flow diverter device" for diverting a flow of mud internal to the drill string 9. The term "weight on bit" relates to the force imposed on the BHA 10. Weight on bit includes a weight of the drill string and an amount of force caused by the flow of mud impacting the BHA 10.

The BHA 10 also contains a communication device 19 that can induce pressure fluctuations in the drilling fluid 31 or introduce electromagnetic pulses into the drill string 9. The pressure fluctuations, or pulses, propagate to the surface through the drilling fluid 31 or the drill string 9, respectively and are detected at the surface by a sensor 18 and conveyed to a control unit 24. The sensor 18 is connected to the flow line 13 and may be a pressure transducer, or alternatively, may be a flow transducer. In the context of the present invention, the communication device 19 carries data representing images formed by a resistivity imager from the BHA 10 to the control unit 24. In particular, the communication device 19 carries compressed data that is decompressed by the control unit 24 to form resistivity images.

Figure 2:
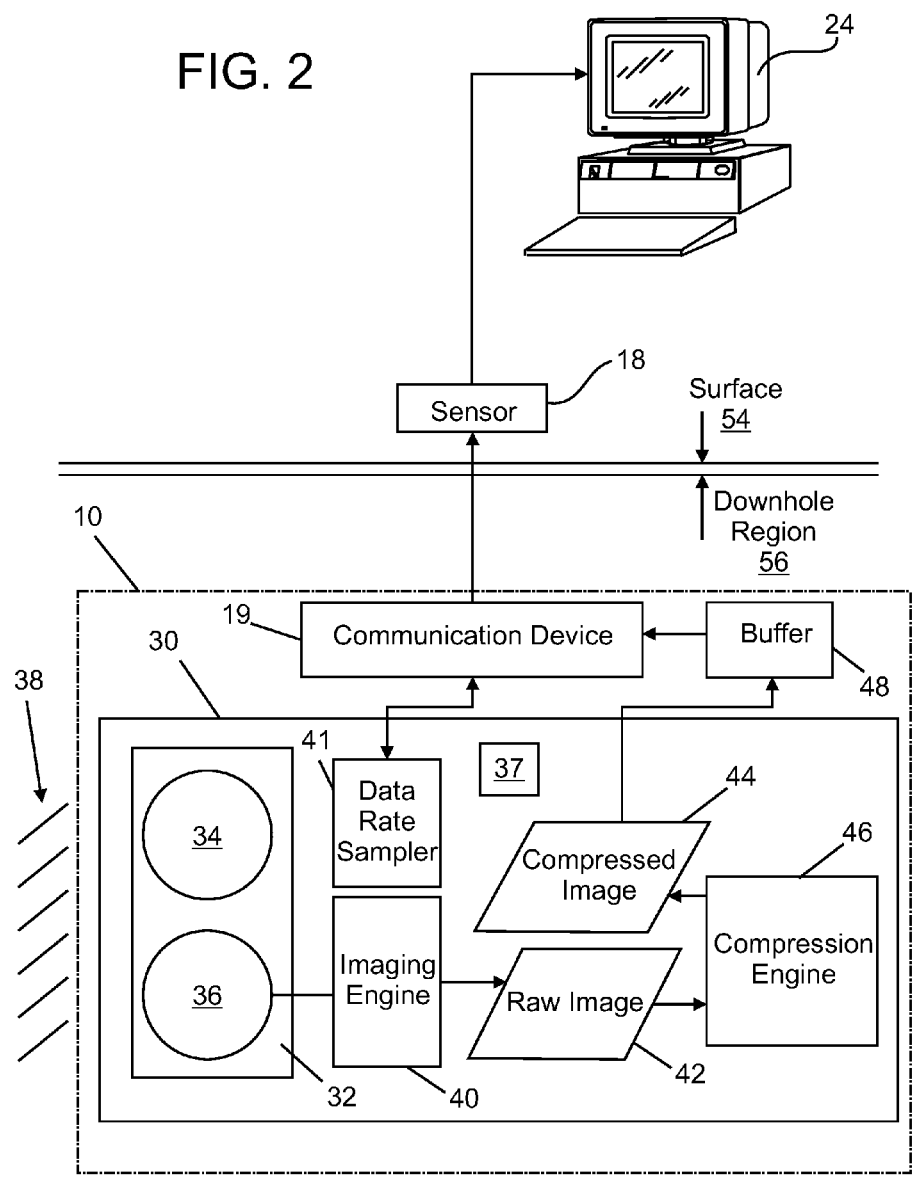
FIG. 2 is a block diagram showing a resistivity imager according to one embodiment in communication with a control unit.

FIG. 2 illustrates a resistivity imager 30 in communication with a control unit 24. The resistivity imager 30 can be included, for example, as part of the BHA 10 illustrated in FIG. 1. The resistivity imager 30 includes one or more electrode pads 32 that carry electrodes 34 and 36 for transmitting current into the formation 38. The measurement electrode 36, or button, measures the voltage to drive the current and the current induced into the formation 38. Based generally on Ohms law, the resistivity of the formation 38 is determined. The imaging engine 40 receives resistivity values. At the same time it receives the orientation of the imager 30 relative to a reference direction. Typically, this orientation is measured by a magnetometer 37 referenced to borehole highside. The imaging engine 40 forms a raw image 42 based on the resistivity and orientation measurements. In order to be of practical real time use, the raw image 42 needs to be compressed to form a compressed image 44 by a compression engine 46. In one embodiment, the compressed image 44 is provided to a buffer 48. The buffer 48 can be part of the resistivity imager 30 or, as illustrated, can be a general buffer maintained for the communication device 19. Regardless, the communication device 19 causes the contents of the buffer 48 to be transmitted from the downhole region 56 to the surface 54. At the surface 54, the data is received at a sensor 18 where is it converted into a digital form and provided to control unit 24 where the compressed image is decompressed to form a resistivity image.

In one embodiment, the communication device 19 causes each image to be transmitted for a fixed amount of time. The fixed amount of time shall be referred to herein as the transmission window.

Figure 3:
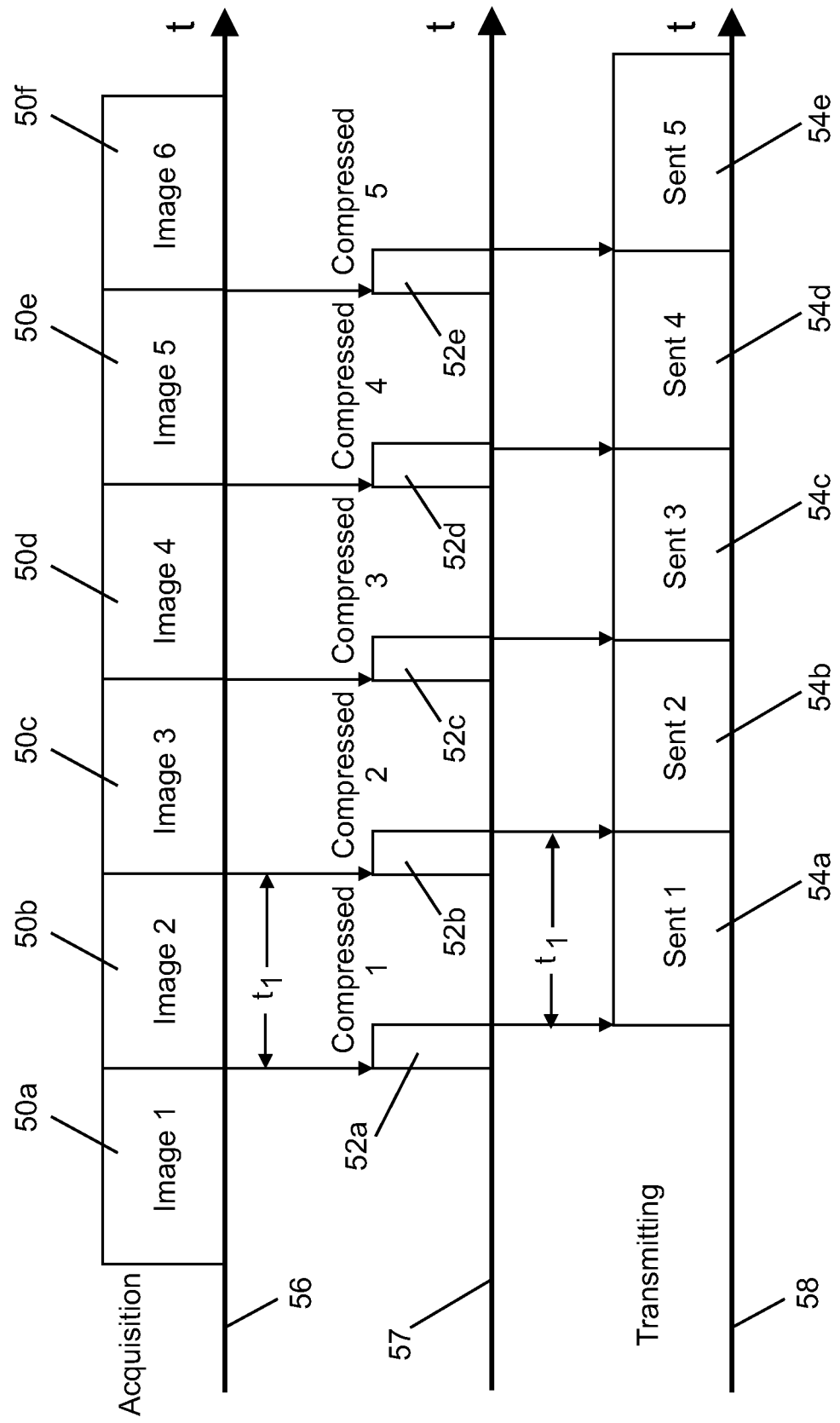
FIG. 3 is a timing diagram illustrating the relationship between image acquisition, compression and transmission.

FIG. 3 illustrates an example relationship between acquisition timing 56, compression timing 57 and transmission timing 58. In this example, a raw image 50a-50f is acquired by the resistivity imager every $t_1$ seconds. In this example, $t_1$ is the transmission window.

As soon as a raw image 50 has arrived, it is compressed as illustrated by the relationship between the acquisition timing 56 and the compression timing 57. In particular, a first compressed image 52a is formed from a first raw image 50a and $t_1$ seconds later, a second compressed image 52b is formed from a second raw image 50b. Similarly, as soon as the compressed images 52 are formed, they are transmitted during respective transmission time slots 54 as is illustrated by the relationship between the compression timing 57 and the transmitting timing 58.

In the example shown in FIG. 3, each compressed image is transmitted over a fixed transmission window. That is, each compressed image 54 is transmitted for $t_1$ seconds. After $t_1$ second have elapsed, the next compressed image 54 is transmitted. Assuming the compression parameters are kept constant, operating in the manner shown in FIG. 3 will result in greater compression losses for more detailed images.

Figure 4:
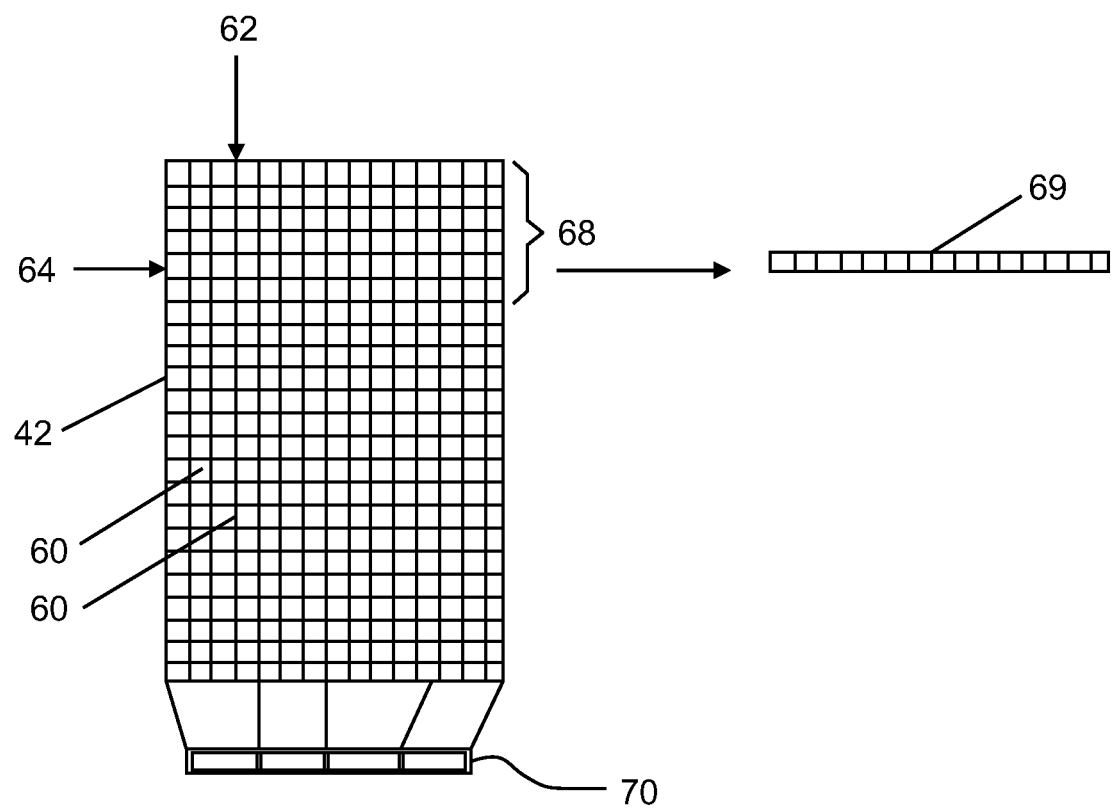
FIG. 4 illustrates a raw image and dimensions in which it can be compressed.

Referring now to FIG. 4, a raw image 42 consists of a matrix of cells 60 where each cell is characterized by a toolface angle and a value (e.g., resistivity measurement). In operation, MWD tools, such as resitivity imager 30 of FIG. 2, are included within and rotated by a BHA as it rotates in a borehole. In practice, the number of columns 62 is a function of the sampling rate of the resistivity imager 30. For purposes herein, the raw image 42 will be considered to include 120 columns. Of course, the number of columns 62 is variable can be changed depending on the context. As such, one of ordinary skill in the art will realize that the 120 column example given herein is merely by way of example. It is further assumed that each row 64 is assigned to measurements taken in a particular time frame. For purposes of discussion herein, assume that each row corresponds to one second.

In operation, each time the resitivity imager 30 samples the formation, the measurement is stored in a "bin." Each bin corresponds to a different column and, as such, to a range of toolface angles. Assuming 120 columns and that each row represents one second, each bin receives measurements corresponding to a three degree span of toolface angles. The number of measurements provided to each of the bins during each acquisition period (e.g., each second) will, of course, depend on the rotation rate of the BHA. As such, in some cases, each bin will include a single value. In others cases, each bin can include multiple values that may, for example, be averaged or otherwise manipulated to derive a single value for each cell. In yet another case, not every bin will include measurements. Further explanation of how measurements are binned and used to form resistivity images is beyond the scope of the present invention and not discussed further herein.

In some prior applications, guided by the constraints of the transmission rate and the desired resolution, a user of a MWD system sets realtime compression parameters for the JPEG method to covert a raw image to a compressed image. These compression parameters can include time and azimuth resolution, color depth, and compression factor. The time resolution, as the term is used herein, refers to the amount of time each row in the compressed image represents. For example, assume the time resolution is five seconds. In such a case, a group 68 of five consecutive rows 64 would be averaged together to form a single row 69 in a compressed image, assuming the raw image is sampled at 1 second. The azimuth resolution, as the term is used herein, refers to how the bins (e.g., columns) are downsampled to form the compressed image. For example, the azimuth resolution can be set to 8, 16, 32, or 64 to name a few. In the present example, weighted averages can be used to downsample the columns 62 to the chosen azimuth resolution as illustrated by azimuthally downsampled row 70 that includes fewer reduced columns 71 than the number of columns 62 in raw image 42. Of course, other manners of downsampling could be employed. The compression factor is a function of the time and azimuth resolutions and can also be based on the number of bits used to represent the value of each cell. In one embodiment, the compression factor product of the realtime time resolution/compressed time resolution and the ratio of the number stored values (e.g., 8, 16, etc.) to the number columns in the image.

In prior system, the compression parameters were typically defined by the user and could only be changed during a drilling run by communicating to the BHA. In order to set these parameters, the desired quality of the compressed image is simulated before a drilling run starts to enable the user choose an optimal set of compression parameters. However, most of the time the chosen parameter set is not optimal because formation homogeneity is usually not known and is not constant. For example, the formation can include a different level of detail than expected or the transmission rate of the channel could be different than expected. In addition, if the transmission rate varies below a minimal value, details could be lost because the "details" are sent last according to the JPEG format.

According to one embodiment of the present invention, based on the transmission rate and detail of an image, the compression parameters can be changed in real time without receiving a message or other information from a surface based computing device (e.g., controller 24) instruction the MWD device to change the compression parameters.

Referring again to FIG. 2, the resistivity imager 30 includes a data rate sampler 41. The data rate sampler 41 determines the transmission rate at which the communication device 19 (e.g., a mud pulser) is providing data to the surface 54. There are several ways in which the data rate sampler 41 can determine the transmission rate. For instance, the frequency of data requests from the communication device 19 to the buffer 48 can be logged. Taking into account the amount of data transmitted in each request, an average transmission rate is computed. It shall be understood that the data rate sampler may be included in a different location than illustrated in FIG. 2. For instance, the data rate sampler 44 could be located at any location in the BHA 10.

Based on transmission rate determined by the data rate sampler 44, the number of bits per transmission window can be calculated. The transmission window, as the term is used herein, is the parameter that defines the time allotted to the resistivity imager 30 to transmit a single image.

The number of bits per transmission window (transmitted data) can then be compared the number of the data bits which are needed to transmit a lossless image or an image with a defined loss after the compression process ("needed data") to form a compression ratio. In one embodiment, the compression ratio is defined as the needed data divided by the transmitted data. If the compression ratio is greater than one, the compression factor needs to be increased until compression ratio falls below 1. In one embodiment, the compression engine 46 can automatically increase the compression factor until the compression ratio falls below one. As one of ordinary skill will realize, increasing the compression factor can include one or both of increasing the time and azimuth resolutions. In such a case, the compression engine 46 then applies the new compression parameters and creates a new compressed image 44 that is transmitted to the surface.

In some cases, the compressed image 44 may be so complex that no set of compression parameters can be derived while still maintaining a desired image quality. In such cases, and according to one embodiments of the present invention, the raw image 42 is split in two or more parts. This reduces the complexity of the image and, as such, allows for more efficient compression. While a seemingly simple solution, it can create problems due to the fact that rather than a single image, two images must now be sent in the same transmission window. One solution would be to just provide buffer 48 with sufficient storage such that it could accumulate "unsent images" and transmit them later. This time-delay, however, can become too large in some instances and, as such, can become unacceptable.

Figure 5:
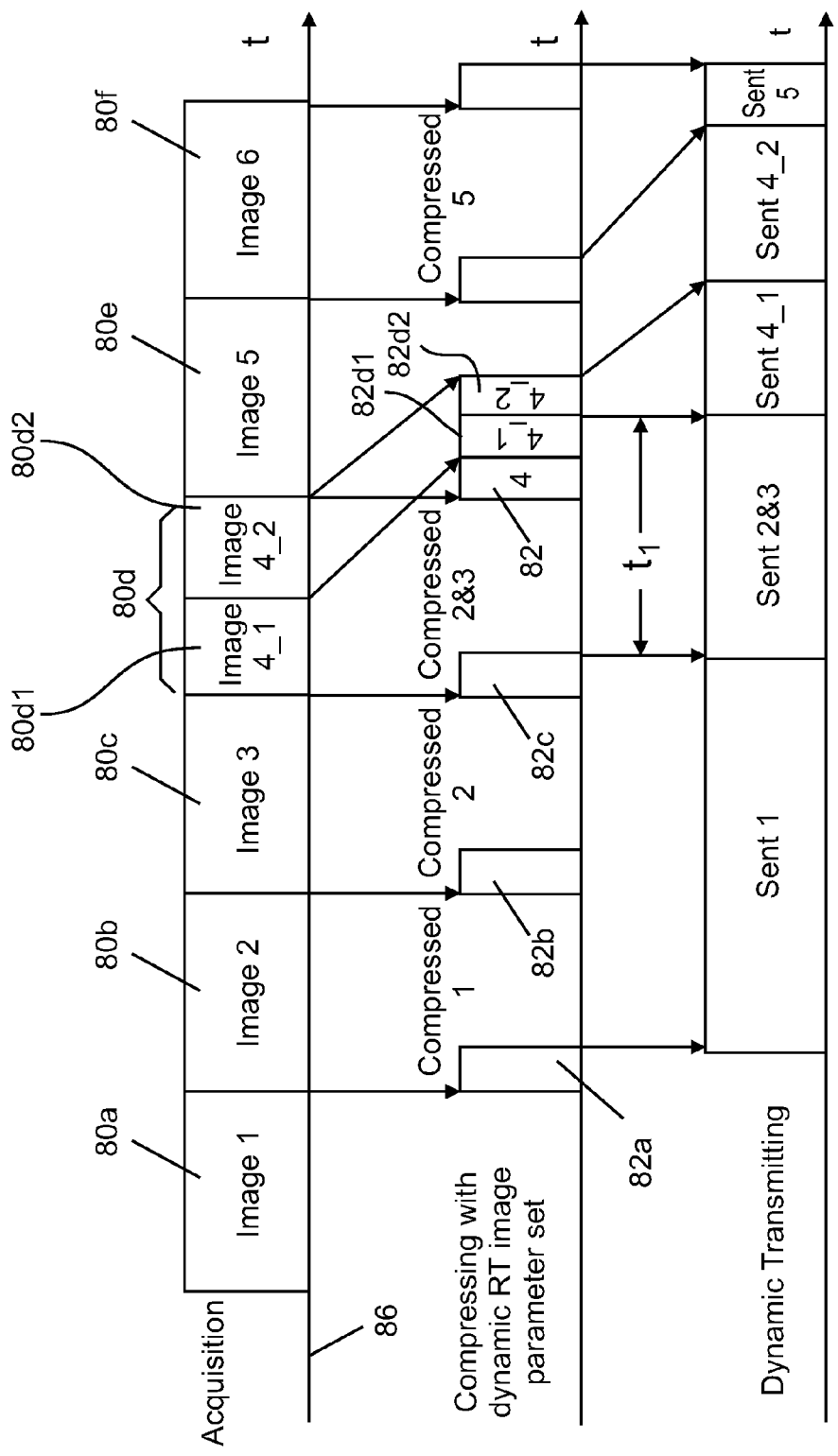
FIG. 5 is another timing diagram illustrating the relationship between image acquisition, compression and transmission.

FIG. 5 illustrates an alternative relationship between acquisition timing 86, compression timing 88 and transmission timing 90 according to the present invention. transmission timing schemes that can be employed to transmit images. In FIG. 5, raw images 80a-80f are acquired by a resistivity imager at a fixed acquisition rate $t_1$. $t_1$ is the same as the transmission window $t_1$ described above with respect to FIG. 3.

FIG. 5 several assumptions are made to illustrate different aspects of the present invention. First, assume that there is a standard set of compression parameters that are initially applied to each raw image. From this standard set, the determination described above of whether the compression ratio is sufficient is made. In certain cases, it may be determined that, for example, a particular image does not need as much compression as would be given by the standard set of compression parameters. In FIG. 5, assume that raw images 80b and 80c fall into such a category. In one example, the raw images 80b and 80c could be combined by doubling the time resolution for the compression of raw image 80b. That is, images compressed image 92c includes both raw images 90b and 90c and is transmitted in a single transmission window ($t_1$). In such a case, as an example, more time than the standard transmission window can be allotted to a more complex image such as, for example, raw image 90a.

In some cases, a particular image may be so complex that it needs to be split into two images. Assume that raw image 80d is such an image. In one embodiment, it can be determined that 80d is such an image when there is no combination of compression parameters that be applied to create compressed image 82*d* such that it can be transmitted without losses or acceptable losses during a transmission window. In such a case, image 80*d* can be split into raw images 80*d*1 and 80*d*2 that are then compressed to form compressed images 82*d*1 and 82*d*2, respectively. In such a case, the two images can be sent over a time period that can exceed the transmission window. The extended time for transmitting raw image 80*d* can be made up, for example, by a more homogeneous image (e.g., raw image 90*e*). In one embodiment, the duration of the transmission of a split compressed image 82*d*1 and 82*d*2 is determined from the needed number of bits and the measured transmission rate.

From FIG. 5 is apparent that during the process the transmission of images may be delayed, for instance if several complex images like raw image 90*d* immediately follow one another. In such a case, two approaches can be taken to avoid accumulating unacceptable time-delay increases: (1) set a maximum allowable time-delay an stop allowing for expanded transmission windows after the maximum is reached; and (2) even if the time-delay is large and the complexity of the current image would not allow to send it in a shorter time-frame, do not use 100% of the transmission window. For instance, 90% of the transmission window could be utilized until the time-delay is reduced below maximum allowable time-delay. While such a solution may lead to a larger compression ratio (e.g., poorer quality) for the images transmitted with 90% of the transmission window such a quality reduction may be acceptable To that end, it shall be understood, that the compression engine 46 (FIG. 2) can include a counter or other device to monitor the amount of time-delay.

Referring again to FIG. 2, to synchronize between the resistivity imager 30 and the control unit 24, the header of each transmitted compressed image can include the dynamic parameter set in addition to the timestamp for the image. The control unit 24 can calculate from the time resolution how "long" the image is and store the image with the correct timestamp.

In support of the teachings herein, various analysis components may be used, including a digital and/or an analog system. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), cooling component, heating component, magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed:

1. A dynamic data compression system for forming and transmitting data from a downhole location within a borehole penetrating the earth to a surface location, the system comprising:
a data source that forms raw data sets of a formation contacting the borehole, the raw data sets being formed at a fixed rate;
a data rate sampler that determines a transmission rate of a transmission channel; and
a compression engine configured to compress the raw data sets according to compression parameters to form compressed data sets, wherein the compression parameters are dynamically changed based on the transmission rate.

2. The system of claim 1, wherein the compression parameters are dynamically changed without receiving an instruction from a computing device located at the surface location.

3. The system of claim 1, wherein the compression parameters are dynamically changed to create a data stream with a bandwidth smaller than or equal to the transmission rate.

4. The system of claim 1, wherein the image source includes a resistivity imager.

5. The system of claim 1, wherein the compression parameters include at least one of a time resolution and an azimuth resolution.

6. The system of claim 5, wherein the image compression engine is configured to determine that a compression ratio of needed bits to transmitted bits exceeds a limit and to change at least one of the compression parameters.

7. The system of claim 1, wherein the image compression engine is configured to split the raw image into at least two images and compresses the at least two images separately.

8. The system of claim 7, wherein the image compression engine is configured to select the best position of the split point between two images.

9. The system of claim 1, wherein the compression parameters include a time resolution and the image compression engine is configured to increase the time resolution for a first raw image such that it covers both the first raw image and a second raw image formed immediately after the first raw image and to compresses the first raw image and the second raw image into a single compressed image.

10. The system of claim 1, wherein the compression engine includes the compression parameters in a header associated with a respective compressed image.

11. The system of claim 10, further comprising:
a receiver that receives the compressed image, decompresses it based on the compression parameters to form a decompressed image and stores the decompressed image.

12. A method of dynamically compressing resistivity images formed by an imager of a formation contacting a borehole penetrating the earth, the method comprising:
compressing a raw image received from the imager to form an intermediate image, the intermediate image having a compression factor and being compressed according to compression parameters;
determining a transmission rate of a transmission channel communicatively coupling the imager to a surface location;
determining with an image compression engine located in the borehole that a needed compression ratio that is based on the transmission rate is greater than one;
dynamically adjusting the compression parameters to form adjusted compression parameters such that the compression ratio is less than one; and
compressing the raw image according the adjusted compression parameters.

13. The method of claim 12, wherein the compression parameters are dynamically adjusted without the reception of an instruction from a computing device located at a surface location.

14. The method of claim 13, wherein the compression parameters are dynamically changed to create a data stream with a bandwidth smaller than or equal to the transmission rate.

15. The method of claim 12, wherein the raw image is compressed according to one ore more of the following formats: JPEG, Discrete wavelet, Fourier Transform, cosine transform, arithmetic encoding, compressive sensing.

16. The method of claim 12, wherein the compression parameters include at least one of a time resolution and an azimuth resolution.

17. The method of claim 16, wherein the image compression engine is configured to decrease the azimuth resolution, increase the time resolution or both to cause an actual compression ratio to exceed the needed compression ratio.

18. The method of claim 12, wherein the image compression engine is configured to split the raw image into at least two images and compress the at least two images separately.

19. The method of claim 12, wherein the compression parameters include a time resolution and the time resolution for a first raw image is increased such that it covers both the first raw image and a second raw image formed immediately after the first raw image such that a combined image of that includes the first raw image and the second raw image is formed and wherein compressing the raw image includes compressing the combined image.

20. The method of claim 12, wherein the image is a resistivity image.

* * * * *